(12) United States Patent
Zenaitis et al.

(10) Patent No.: US 10,435,631 B2
(45) Date of Patent: Oct. 8, 2019

(54) PROCESS FOR SEPARATING PARTICLES CONTAINING ALKALI METAL SALTS FROM LIQUID HYDROCARBONS

(71) Applicant: Field Upgrading Limited, Calgary (CA)

(72) Inventors: Michael Zenaitis, Calgary (CA); Mykola Makowsky, Calgary (CA); John Howard Gordon, Salt Lake City, UT (US); Jeff Killpack, Sandy, UT (US)

(73) Assignee: Enlighten Innovations, Inc., Calgary (CA)

( * ) Notice: Subject to any disclaimer, the term of this patent is extended or adjusted under 35 U.S.C. 154(b) by 65 days.

(21) Appl. No.: 15/725,252

(22) Filed: Oct. 4, 2017

(65) Prior Publication Data

US 2018/0094198 A1  Apr. 5, 2018

Related U.S. Application Data

(63) Continuation-in-part of application No. 15/446,299, filed on Mar. 1, 2017.

(60) Provisional application No. 62/404,119, filed on Oct. 4, 2016, provisional application No. 62/513,871, filed on Jun. 1, 2017.

(51) Int. Cl.

| | | |
|---|---|---|
| *C10G 21/08* | (2006.01) | |
| *C10G 21/12* | (2006.01) | |
| *C10G 29/10* | (2006.01) | |
| *C10G 31/06* | (2006.01) | |
| *C10G 31/09* | (2006.01) | |
| *C10G 31/10* | (2006.01) | |
| *C10G 29/06* | (2006.01) | |
| *C10G 19/00* | (2006.01) | |
| *C25C 1/02* | (2006.01) | |
| *C10G 21/30* | (2006.01) | |
| *C01B 17/22* | (2006.01) | |
| *C01B 17/30* | (2006.01) | |
| *C01B 17/32* | (2006.01) | |
| *C10G 31/08* | (2006.01) | |
| *C10G 53/10* | (2006.01) | |
| *C10G 53/12* | (2006.01) | |
| *C10G 17/02* | (2006.01) | |
| *C10G 19/08* | (2006.01) | |
| *C10G 29/02* | (2006.01) | |
| *C10G 19/067* | (2006.01) | |

(52) U.S. Cl.
CPC .............. *C10G 29/06* (2013.01); *C01B 17/22* (2013.01); *C01B 17/30* (2013.01); *C01B 17/32* (2013.01); *C10G 17/02* (2013.01); *C10G 19/00* (2013.01); *C10G 19/067* (2013.01); *C10G 19/08* (2013.01); *C10G 21/12* (2013.01); *C10G 21/30* (2013.01); *C10G 29/02* (2013.01); *C10G 31/06* (2013.01); *C10G 31/08* (2013.01); *C10G 31/09* (2013.01); *C10G 31/10* (2013.01); *C10G 53/10* (2013.01); *C10G 53/12* (2013.01); *C25C 1/02* (2013.01); *C10G 2300/104* (2013.01); *C10G 2300/202* (2013.01); *C10G 2300/205* (2013.01)

(58) Field of Classification Search
CPC ........ C10G 21/08; C10G 21/12; C10G 29/10; C10G 31/06; C10G 31/09; C10G 31/10; C10G 2300/202
See application file for complete search history.

(56) References Cited

U.S. PATENT DOCUMENTS

| | | |
|---|---|---|
| 1,300,816 A | 4/1919 | Cobb et al. |
| 3,785,965 A | 1/1974 | Welty |
| 3,787,315 A | 1/1974 | Bearden et al. |
| 3,788,978 A | 1/1974 | Bearden, Jr. et al. |
| 3,791,966 A * | 2/1974 | Bearden, Jr. ........... C10G 53/12 208/208 M |
| 3,849,297 A | 11/1974 | Long |
| 4,003,824 A | 1/1977 | Baird et al. |
| 4,076,613 A | 2/1978 | Bearden, Jr. |
| 5,695,632 A | 12/1997 | Brons et al. |
| 5,935,421 A | 8/1999 | Brons et al. |
| 6,210,564 B1 | 4/2001 | Brons et al. |
| 8,088,270 B2 | 1/2012 | Gordon et al. |
| 8,747,660 B2 | 6/2014 | Gordon et al. |
| 9,688,920 B2 | 6/2017 | Gordon et al. |
| 2014/0197040 A1 | 7/2014 | Gordon et al. |
| 2014/0224709 A1 | 8/2014 | Gordon et al. |
| 2014/0311949 A1 | 10/2014 | Gordon |
| 2016/0053185 A1 | 2/2016 | Gordon et al. |

OTHER PUBLICATIONS

America's Strategic Unconventional Fuels—Resource and Technology Profiles, 2007, pp. 111-125, vol. 3.
International Search Report and Written Opinion in International Application No. PCT/US2017/020199 dated May 29, 2017(8 pages).
International Search Report and Written Opinion in International Application No. PCT/US2017/055213 dated Dec. 19, 2017 (68 pages).

(Continued)

*Primary Examiner* — Randy Boyer
(74) *Attorney, Agent, or Firm* — Foley & Lardner LLP (57) ABSTRACT

The present technology provides a process that includes heating a first mixture of elemental sulfur and particles comprising an alkali metal sulfide in a liquid hydrocarbon to a temperature of at least 150° C., to provide a sulfur-treated mixture comprising agglomerated particles; and separating the agglomerated particles from the sulfur-treated mixture to provide a desulfurized liquid hydrocarbon and separated solids. This process may be used as part of a suite of processes for desulfurizing liquid hydrocarbons contaminated with organosulfur compounds and other heteroatom-based contaminants. The present technology further provides processes for converting carbon-rich solids (e.g., petroleum coke) into fuels.

34 Claims, 2 Drawing Sheets

(56) References Cited

OTHER PUBLICATIONS

Lu, et al., "Advanced intermediate-temperature Na—S battery," Energy & Environmental Science, 2013, pp. 299-306. vol. 6.
Non-Final Office Action on U.S. Appl. No. 15/446,299 dated Mar. 5, 2019.

* cited by examiner

PROCESS FOR SEPARATING PARTICLES CONTAINING ALKALI METAL SALTS FROM LIQUID HYDROCARBONS

CROSS REFERENCE TO RELATED APPLICATIONS

This claims the benefit of and priority to U.S. Provisional Application No. 62/404,119 filed Oct. 4, 2016, U.S. Provisional Application No. 62/513,871 filed Jun. 1, 2017, and is a Continuation-in-Part of U.S. application Ser. No. 15/446,299 filed Mar. 1, 2017 the contents of which are incorporated herein by reference in their entireties.

FIELD OF THE TECHNOLOGY

The present technology relates to a process for removing particles containing alkali metal salts, such as alkali metal sulfides, from liquid hydrocarbons. It further relates to processes for converting carbon-rich solids into fuels

BACKGROUND OF THE TECHNOLOGY

Liquid hydrocarbons, including many oil feedstocks, often contain difficult to remove sulfur in the form of organosulfur compounds as well as metals and other heteroatom-containing compounds that hinder usage of the hydrocarbons. Sulfur can cause air pollution, and can poison catalysts used in petroleum processing or catalysts designed to remove hydrocarbons and nitrogen oxide from motor vehicle exhaust. There has been a worldwide trend to limit the amount of sulfur in hydrocarbon fuels, such as gasoline, diesel, and fuel oils, including marine bunker fuels. Metals contained in the hydrocarbon stream can also poison catalysts typically utilized for removal of sulfur through standard and improved hydro-desulfurization processes whereby hydrogen reacts under extreme conditions to break down the sulfur bearing organosulfur molecules.

Sodium has been recognized as potentially effective for the treatment of high-sulfur hydrocarbons, including petroleum oil distillate, crude, heavy oil, bitumen, and shale oil. Sodium is capable of reacting with the oil and its contaminants to dramatically reduce the sulfur, nitrogen, oxygen, and metal content through the formation of sodium sulfide compounds (sulfide, polysulfide and hydrosulfide) as well as other byproducts. However, removal of these byproducts from the treated feedstock can be challenging. The suspensions and/or emulsions the byproducts may form often cannot be completely removed using standard separation techniques, and can be difficult to carry out efficiently on an industrial scale. Indeed, no large scale desulfurization using sodium metal or other alkali metals is in regular commercial use due in part to this problem.

BRIEF SUMMARY OF THE TECHNOLOGY

The present technology provides a process for separating particles containing alkali metal salts from liquid hydrocarbons. Such mixtures result from the use of alkali metals (in their metallic state) to remove nitrogen, sulfur, oxygen and heavy metals from liquid hydrocarbons (e.g., oil feedstocks) contaminated with compounds containing such heteroatoms. The process includes heating a first mixture of elemental sulfur and particles comprising an alkali metal sulfide in a liquid hydrocarbon to a temperature of at least 150° C., to provide a sulfur-treated mixture comprising agglomerated particles. The process further includes separating the agglomerated particles from the sulfur-treated mixture to provide a desulfurized liquid hydrocarbon and separated solids. The present technology further provides methods for removal of residual alkali metal from the desulfurized liquid hydrocarbons and for preparing the separated solids for electrochemical regeneration of the alkali metal. The desulfurized and demetallized liquid hydrocarbons produced typically have less than 0.5 wt % sulfur and less than 100 ppm alkali metal, and meet, for example, contaminant limits for bunker fuel without further processing. This process is also applicable to processes for converting carbon-rich solids into fuels.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the processes described herein, as defined by the claims, will become apparent in the detailed description set forth herein and taken in conjunction with the accompanying drawings.

BRIEF DESCRIPTION OF THE DRAWINGS

In order that the manner in which the above-recited and other features and advantages of the technology are obtained will be readily understood, a more particular description of the technology briefly described above will be rendered by reference to specific embodiments thereof that are illustrated in the appended drawings. Understanding that these drawings depict only typical embodiments of the technology and are not therefore to be considered to be limiting of its scope, the technology will be described and explained with additional specificity and detail through the use of the accompanying drawings in which.

DETAILED DESCRIPTION OF THE TECHNOLOGY

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The present technology provides a process for separating particles containing alkali metal salts, including alkali metal sulfides, from liquid hydrocarbons. The separation process may be employed as part of a series of processes for desulfurizing and otherwise removing metals and other heteroatom contaminants from liquid hydrocarbons as well as carbon-rich solids in a liquid hydrocarbon including but not limited to bunker oil, as well as petroleum oil distillate, crude, heavy oil, bitumen, shale oil, and refinery intermediate streams (for example, solvent deasphalting tar, steam cracked tar, atmospheric or vacuum residuals, FCC slurry, visbreaker tar, hydrotreater, hydrocracker or hydroconversion bottoms, coke and asphalt).

Liquid hydrocarbons contaminated with sulfur compound(s), and optionally one or more nitrogen compounds, oxygen compounds and heavy metals, may be desulfurized and decontaminated by contacting the hydrocarbons with a molten alkali metal (in its metallic state) such as sodium, potassium or lithium (or mixtures or alloys thereof) to remove the heteroatoms, and to provide a mixture of the liquid hydrocarbon and particles comprising alkali metal sulfides. A capping agent is typically used to cap the radicals formed when sulfur and other heteroatoms have been abstracted by the alkali metal. The capping agent may be hydrogen, a $C_{1-6}$ acyclic alkane, $C_{2-6}$ acyclic alkene, hydrogen sulfide, ammonia, or a mixture of any two or more thereof. The contacting step may be carried out at a temperature of about 250° C. to about 400° C., for example at about 250° C., about 300° C., about 350° C., about 400° C. or a range between and including any two of the foregoing temperatures. In some embodiments the contacting takes place at about 300° C. to about 400° C. (e.g., 350° C.). The contacting may take place at a pressure of about 400 to about 1500 psi, e.g., at about 400 psi, about 500 psi, about 600 psi, about 750 psi, about 1000 psi, about 1250 psi, about 1500 psi or a range between and including any two of the foregoing values.

The amount of alkali metal in its metallic state used in the contacting step will vary with the level of heteroatom contaminants of the liquid hydrocarbon, the temperature used and other conditions. For example, 1-3 mole equivalents of metallic alkali metal and 1-1.5 moles of capping agent (e.g., hydrogen) may be needed per mole sulfur, nitrogen or oxygen. In addition an excess of metallic alkali metal may be used to drive the reaction towards completion, e.g., a 10%, 15%, 20%, 25%, 30%, 40%, 50% or more excess on a mole equivalent basis may be used. In some embodiments the molten alkali metal used is sodium metal. Any suitable source of molten alkali metal may be used, including, but not limited to electrochemically generated sodium, e.g., per U.S. Pat. No. 8,088,270, incorporated by reference in its entirety herein.

The reaction of metallic alkali metal with heteroatom contaminants in the liquid hydrocarbons is relatively fast, being complete within a few minutes, if not seconds. Mixing the combination of liquid hydrocarbon and metallic alkali metal further speeds the reaction and is commonly used for this reaction on the industrial scale. Hence, in some embodiments the contacting step is carried out for 1 minute to about 5, about 6, about 7, about 9, about 10, about 15 minutes, or about 20 minutes, or is conducted for a time ranging between and including any two of the foregoing values.

The foregoing desulfurization reaction produces a mixture that includes the liquid hydrocarbon and particles comprising alkali metal sulfides. The particles are quite fine (e.g., <10 μm) and cannot be completely removed by standard separation techniques (e.g., filtration or centrifugation) at this stage, especially when the liquid hydrocarbons have a high viscosity, e.g., bottoms and fuel oils. In addition, unreacted metallic alkali metal may be present in such mixtures. Further processing as described below is needed to separate the particles, and provide desulfurized liquid hydrocarbons. In some cases, where the liquid hydrocarbons are especially high viscosity, the hydrocarbon feeds are optionally thermally pretreated before the reaction with alkali metal, e.g., 300-450° C. for 30-60 minutes. Such thermal treatment can reduce the heteroatom content of the liquid hydrocarbon, reducing the amount of alkali metal needed, and simplifying the subsequent separation step.

Surprisingly, it has been found that a separation process comprising heating a first mixture of elemental sulfur and particles comprising an alkali metal sulfide (e.g., sodium sulfide) in a liquid hydrocarbon to a temperature of at least 150° C. provides a sulfur-treated mixture comprising agglomerated particles that are now separable. The separation process thus further includes separating the agglomerated particles from the sulfur-treated mixture to provide a desulfurized liquid hydrocarbon and separated solids.

The separation process may include mixing the first mixture during heating. Depending on conditions (e.g., whether mixing is used, and how high the temperature is, etc.) the first mixture may be heated for a longer or shorter period of time. In some embodiments, the period of time is at least 15 minutes. In others, the first mixture is heated for a period of about 15 minutes to about 2 hours, e.g., about 15 minutes, about 30 minutes, about 45 minutes, about 1 hour, about 1.25 hours, about 1.5 hours, about 1.75 hours, about 2 hours, or a range between and including any two of the foregoing values.

In some embodiments of the separation process, the first mixture is heated to a temperature of about 150° C. to about 450° C., e.g., about 150° C., about 200° C., about 250° C., about 300° C., about 350° C., about 400° C., about 450° C., or to a temperature in a range between and including any two of the foregoing values. In some embodiments, the first mixture is heated to a temperature of about 300° C. to about 400° C.

The pressure at which the separation process takes place is not critical and may be carried out at a wide range of pressures, including atmospheric pressure. In some embodiments, the pressure may be about 15 psi to about 1500 psi, e.g., about 15 psi, about 25 psi, about 50 psi, about 100 psi, about 200 psi, about 300 psi, about 400 psi, about 500 psi, about 750 psi, about 1000 psi, about 1250 psi, about 1500 psi, or a range between and including any two of the foregoing values. More commonly, the pressure may be about 100 psi to about 400 psi. The pressurized gas in the vessels in which the separation process takes place includes hydrogen (predominantly), but can also include one or more of CO, $CO_2$, $H_2S$ and $C_{1-6}$ alkanes and alkenes (e.g., methane, ethane, ethylene, propane, propene, butane, etc.).

In addition to alkali metal sulfides, the first mixture may include alkali metal in its metallic state, also referred to herein as "residual alkali metal". This is especially true where a molar excess of metallic alkali metal was used to generate the mixture of liquid hydrocarbons and particles of alkali metal sulfide. In some embodiments of the separation process, the first mixture comprises 1-100 wt % alkali metal in its metallic state with respect to the weight of alkali metal in the alkali metal sulfide. The first mixture may also include alkali metal oxides and/or metals other than alkali metals.

The amount of elemental sulfur to be added may range from about 0.5 equivalents to about 2 or even about 3 equivalents of sulfur atoms per two equivalents of free sodium atoms present (i.e., those in the metallic state, not ionic). In some embodiments, the amount of elemental sulfur added is 0.5, 0.6, 0.7, 0.8, 0.9, 1.0, 1.1, 1.2, 1.5, 1.75, 2, 2.5, 3.0 equivalents or a range between and including any two of the foregoing values. In some embodiments 0.8 to 1.2 equivalents of elemental sulfur is added. Depending on how much elemental sulfur has been added, the agglomerated particles may comprise an alkali metal sulfide and/or alkali metal hydrosulfide (e.g., sodium sulfide ($Na_2S$) or sodium hydrosulfide (NaHS)). It was surprisingly discovered that when more than a stoichiometric amount of elemental sulfur was added (i.e., more than 1 equivalent of sulfur atoms per 2 equivalents of sodium atoms, that sodium hydrosulfide begins to form rather than the expected sodium polysulfide). Thus in some embodiments, the alkali metal hydrosulfide may predominate.

In some embodiments of the separation process, separating the agglomerated particles from the sulfur-treated mixture includes filtering, settling, or centrifuging the sulfur treated mixture to provide the separated solids. Separating the agglomerated particles from the sulfur-treated mixture may conveniently be performed by centrifuging the sulfur-treated mixture at, e.g., about 15° C. to about 150° C. In some embodiments, the centrifuging takes place at about 120° C. to about 140° C.

In some embodiments, the separating process further includes mixing the separated solids with an organic liquid (suitable for dissolving any liquid hydrocarbon on the separated solids) and separating the separated solids from the organic liquid to provide washed solids. Any suitable organic liquid may be used, including but not limited to toluene, xylene, hexanes, diesel (e.g., coker diesel) and/or condensate (e.g., BTX condensate). The wash liquid containing residual desulfurized liquid hydrocarbons may be sent to a recovery process (e.g., distillation) to recover the organic liquid for reuse or may be mixed with the desulfurized liquid hydrocarbon as product oil. The washed solids may be dried if desired using standard means and electrolyzed as described in U.S. Pat. No. 8,088,270, to recover metallic alkali metal (e.g., sodium) for reuse.

The desulfurized liquid hydrocarbon resulting from the separation process typically contains not more than 0.5 wt % sulfur. In some embodiments, the desulfurized liquid hydrocarbon contains not more than 0.4 wt %, 0.3 wt %, 0.2 wt %, 0.1 wt % or even 0.05 wt % sulfur. In certain embodiments, especially those intended for blending with lower sulfur content hydrocarbons, the desulfurized liquid hydrocarbon contains slightly more than 0.5 wt % sulfur, e.g., 0.6 wt %. Thus, in some embodiments the desulfurized liquid hydrocarbon contains from about 0.05 wt % to about 0.6 wt %. Once the alkali metal sulfide and metals have been separated from the liquid hydrocarbons, sulfur and metals are substantially removed, and nitrogen is moderately removed; also, both viscosity and density are reduced (API gravity is increased).

Depending on the nature of the desulfurized liquid hydrocarbons, there may be considerable alkali metal content remaining, e.g., up to and sometimes exceeding 1% by weight. In some embodiments, such residual alkali metal is present at a level of about 400 ppm to about 10,000 ppm, e.g., about 400, about 600, about 800, about 1,000, about 1,200, about 1,400, about 1,600, about 2,000, about 2,500, about 3,000, about 4,000, about 5,000, about 7,500 or even about 10,000 ppm or in a range between and including any two of the foregoing values. Some of the alkali metal content may be associated ionically at the sites where heavy metals originally held position or ionically associated with napthenates, or finely dispersed in the metallic state, or ionically associated with sulfur, oxygen, or nitrogen which is still bonded to the organic molecules of the oil.

Removal of the residual alkali metal from the oil is required because the alkali metal content is not permitted in most product applications, and most downstream refining processes are also sensitive to the presence of alkali metals. Also if a substantial amount of alkali metal were to leave the system, a large amount of make-up would be required to sustain the process.

Hence, in another aspect the present technology provides a demetallizing process which includes adding a salt-forming substance to the desulfurized liquid hydrocarbon to form a second mixture, wherein the salt-forming substance converts the residual alkali metal to an alkali metal salt. Any suitable salt-forming substance may be used so long as the resulting salt is readily removed from the liquid hydrocarbons. In some embodiments, the salt-forming substance can be selected from the group consisting of elemental sulfur, hydrogen sulfide, formic acid, acetic acid, propanoic acid and water. In some embodiments, acetic acid is used to form sodium acetate salts, which are relatively easy to remove in their solid form. Typically, the amount of salt-forming substance added is equal to about 1 to about 4 times the molar amount of residual alkali metal, e.g., 1, 1.25, 1.5, 2, 2.5, 3, 3.5 mole equivalents or a range between and including any two of the foregoing values. For example, in some embodiments, the amount is equal to about 1 to about 2 mole equivalents.

In some embodiments, the addition of salt-forming substance may be carried out at a temperature of at least 150° C., e.g., a temperature of about 150° C., about 200° C., about 250° C., about 300° C., about 350° C., about 400° C., about 450° C., or within a range between and including any two of the foregoing values. In some embodiments, the addition of salt-forming substance may be carried out at a temperature of about 150° C. to about 450° C.

In certain embodiments, the addition of salt-forming substance is carried out at a pressure of at least about 15 psi. In some embodiments the addition of salt-forming substance is carried out at a pressure of about 15 psi, about 25 psi, about 50 psi, about 100 psi, about 150 psi, about 200 psi, about 250 psi, about 300 psi, about 400 psi, about 500 psi, about 1,000 psi, about 1,500 psi, about 2,000 psi, about 2,500 psi or at a pressure in a range between and including any two of the foregoing values. For example, in some embodiments, the addition is carried out at about 50 psi to about 2,500 psi.

The demetallization process may include separating the alkali metal salts from the second mixture to provide a desulfurized and demetallized liquid hydrocarbon. For example, separating the alkali metal salts from the second mixture may include filtering, settling, or centrifuging the second mixture to remove the alkali metal salts and provide the desulfurized and demetallized liquid hydrocarbon.

Figure 1:
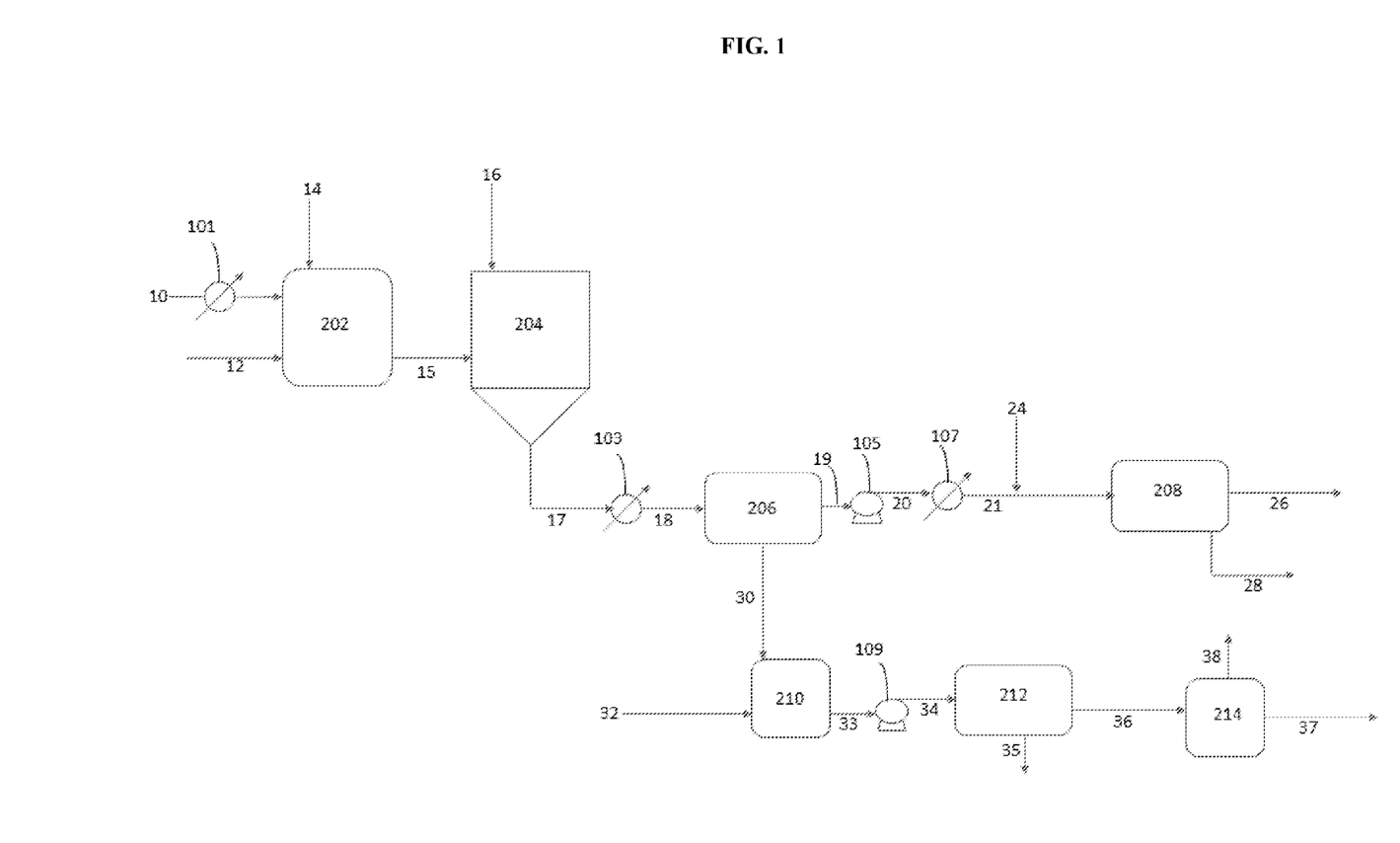
FIG. 1 shows a process flow diagram for an illustrative embodiment of a process for separating particles containing alkali metal sulfide from a liquid hydrocarbon and optional additional processes for removing residual alkali metal from the product hydrocarbon and preparing the separated solids for regeneration of alkali metal, as well as the process for removal of impurities from oil using an alkali metal which generates the mixtures of particles and liquid hydrocarbon.

The present embodiments of the present technology can be understood by reference to the drawings, wherein like parts are designated by like numerals throughout. It will be readily understood that the components of the present technology, as generally described and illustrated in the figure herein, could be arranged and designed in a wide variety of different configurations. Thus, the following more detailed description of the embodiments of the methods and systems of the present technology, as represented in FIG. 1 is not intended to limit the scope of the technology, as claimed, but is merely representative of present embodiments of the technology. In particular, although the present technology may be employed to separate any mixture of alkali metal sulfides from liquid hydrocarbons, FIG. 1 shows an embodiment in which the mixture is generated by reaction of alkali metal with a liquid hydrocarbon contaminated with organosulfur compounds. Optional processes for removing residual alkali metal from the desulfurized hydrocarbon and for preparing the separated alkali metal sulfides for further processing are also described.

As shown in FIG. 1, an oil feedstock 10 may be fed through an optional heat exchanger 101 to be preheated to about 150° C. to about 350° C. before entering reactor 202. An alkali metal 12 in its molten state is also fed to the reactor, along with a radical capping agent 14 which may be hydrogen and/or a hydrocarbon such as methane, ethane, natural gas, and the like. The alkali metal is typically sodium metal but may also be lithium metal, potassium metal, or alloys or mixtures containing any two or more of these metals. The reactor may be operated batch-wise or continuously in the temperature range above the melting temperature of the alkali metal, typically between 150-400° C. but more preferably between 300-360° C. to provide faster reaction kinetics and reduce or avoid thermal cracking. The reaction typically is carried out at a pressure of 500-2000 psi. Under these conditions, the alkali metal often reacts with the sulfur and other heteroatom contaminants in a matter of minutes (e.g., 1-20 minutes) to form fine particles of alkali metal salts, including alkali metal sulfides. See, e.g., U.S. Pat. No. 8,088,270.

The resulting mixture of liquid hydrocarbon and alkali metal salt/sulfide particles exits the reactor through line 15 and is fed to a maturation vessel 204. There it is combined with elemental sulfur, which may conveniently (but is not require to be) in a liquid form (e.g., at 130° C.-160° C.) via line 16 and heated to a temperature of at least about 150° C., typically with mixing, for a period of 15-120 minutes. More typically, the mixture is heated to about 300° C. to about 450° C., or in some embodiments, about 300° C. to about 400° C. Although the processes in reactor 202 and vessel 204 are preferably run continuously, they may be performed in the same vessel if the processes are run batch-wise. The sulfur-treated mixture includes agglomerated particles and exits vessel 204 via line 17, flowing into optional heat exchanger 103 where heat is removed and optionally can be transferred back to the liquid hydrocarbon feed via the heat exchanger 101. The cooled sulfur-treated mixture (at, e.g., about 60-180° C., or even, about 100-140° C.) is fed via line 18 to a solid/liquid separation apparatus 206, which typically includes a centrifuge but may also include a filter. The separated solids 30 exit the separation apparatus for further processing. The resulting desulfurized liquid hydrocarbon is free or substantially free of solids but may contain about 400 to about 4,000 ppm or more residual alkali metal in its metallic form.

The desulfurized liquid hydrocarbon is pumped from the separation apparatus 206 through line 19 using pump 105, and is sent through line 20 into an optional heat exchanger 107 which if present, heats the desulfurized liquid hydrocarbon to about 250° C. to about 350° C. From there the desulfurized liquid hydrocarbon flows through line 21 and is combined with a salt forming substance such as acetic acid from line 24 as described above. The combination of acetic acid or other salt forming substance and the residual alkali metal forms additional solids comprising alkali metal salts. These solids are removed by a second separation apparatus 208 (e.g., a centrifuge) to yield the desulfurized and demetallized liquid hydrocarbon product 26 and alkali metal salt solids 28.

The separated solids 30 from apparatus 206 are transported via chute or other suitable means to the washing tank 210, where they are mixed with an organic liquid 32 (as defined above) such as toluene, xylene, hexanes, diesel, condensate or combinations of any two or more thereof or some other organic liquid suitable for washing. The now washed solids are pumped out of the washing tank through line 33 using pump 109 and through line 34 to another solids-liquids separation apparatus 212 where most of the organic liquid 35 is recovered. If the recovered organic liquid is, e.g., diesel, it is stored with other desulfurized liquid hydrocarbons for later sale as product. If the recovered organic liquid is not a fuel product, it is reused as a wash liquid. The washed solids are transported to a dryer where any residual organic wash liquid is removed in a dryer 214. In the drying step, the washed solids are heated in a non-oxidizing atmosphere to a temperature of, e.g., 150-350° C. to recover the wash liquid 38 which may be returned back to the process as a wash liquid in the wash tank 210. The dryer could be any commercially available process including paddle dryers, spray dryers or indirectly fired kilns. The dried washed solids are ready for recycling by, e.g., electrochemical treatment to recover the alkali metal in its metallic state as described, e.g., in U.S. Pat. No. 8,088, 270 or 8,747,660.

In another aspect, the present technology also provides processes for converting carbon-rich solids into fuels. Carbon-rich solids (at room temperature) are solids that contain at least 75 wt % carbon. Examples include petroleum coke, asphaltenes, and coal. Such carbon-rich solids generally have at least 0.5 wt % sulfur prior to treatment by the present process. Hence, in one aspect the present technology provides a process that includes treating (e.g., contacting) a slurry or suspension of a carbon-rich solid having at least 0.5 wt % sulfur in a liquid hydrocarbon with a molten alkali metal and a capping agent as above (e.g., hydrogen, a $C_{1-6}$ acyclic alkane, $C_{2-6}$ acyclic alkene, hydrogen sulfide, ammonia, or a mixture of any two or more thereof). This process is carried out at an elevated temperature and pressure. The process converts at least a portion of the carbon-rich solids into a liquid fuel (e.g., residual fuel oil or refinery feedstocks) and particles comprising alkali metal sulfides. The liquid fuels have a reduced sulfur, metal and heteroatom content compared to the starting solids, e.g., not more than 0.2 or even 0.1 wt % sulfur. Liquid fuels of the present technology include any hydrocarbon or hydrocarbon mixture that is/are used in a liquid state and may be burned as fuel. Hence liquid fuels include not only gasoline, kerosene and diesel, but fuel oil, residual fuel oil, and the like.

In some embodiments, the present methods include treating a slurry or suspension of petroleum coke in a liquid hydrocarbon with a molten alkali metal and one or more capping agents at an elevated temperature and pressure to convert at least a portion of the petroleum coke into a liquid fuel and inorganic solids in admixture with the liquid hydrocarbon.

The carbon-rich solids, e.g., petroleum coke, are not soluble in the liquid hydrocarbon and are therefore present as a slurry or suspension. The slurry or suspension may contain, e.g., from 1 wt % to 20 wt % based on the total mass of the solids and the liquid hydrocarbon. It will be understood that the slurries/suspensions may include any suitable percentage of carbon-rich solids within this range such as 1, 2, 3, 4, 5, 6, 7, 8, 9, 10, 11, 12, 13, 14, 15, 16, 17, 18, 19, or 20 wt %, or a range between and including any two of the foregoing values, such as 1-15 wt %, 3-15 wt %, or 4 or 5 wt %-10 or 11 wt %.

The liquid hydrocarbon used in the slurry or suspension is selected to provide both a good slurry or suspension and dissolve the liquid fuels produced. Thus, heavy hydrocarbons with sufficient densities to fluidize the petroleum coke or other carbon-rich solids may be used including, e.g., hydrocarbons having densities of 800 to 1100 kg/m$^3$ at room temperature. Suitable densities include 800, 900, 1000, and 1100 kg/m$^3$ or a range between and including any two of the foregoing values. Suitable liquid hydrocarbons include virgin crude oil, bitumen, refinery intermediates, such as fluid catalytic cracker slurry, hydrocracker bottoms or vacuum residual, shale oil, or a residual fuel oil, and may be the same or different from the liquid fuel being produced by the present process. In some embodiments, the liquid hydrocarbon itself may be part of a composition that is in need of desulfurization because it includes sulfur and optionally other heteroatoms such as nitrogen, oxygen and metals (e.g., vanadium).

Before being suspending in the liquid hydrocarbon, the petroleum coke or other carbon-rich solids are crushed and milled to a powder or dust to reduce particle size and promote the reaction with the molten alkali metal. For example the solids may be milled so that the majority of particles have a diameter of not more than 1 mm. In some embodiments the majority of particles range in size from 1 um to 1 mm.

In the present processes, molten alkali metal (i.e., in its metallic state) is believed to react with the coke (or other carbon-rich solids) and form liquid hydrocarbons that can be used as fuels. In some embodiments, the alkali metal may be lithium, sodium, potassium or an alloy thereof. While not wishing to be bound by theory, it is believed that the during the present processes, the alkali metal, e.g., sodium, reacts with the coke and hydrogen according to the following reaction:

(equation 1)

(equation 2)

In these chemical equations, R and R' represent carbon rich organic constituents found in coke, each covalently bonded to a sulfur atom. It is believed sodium oxidizes, giving up an electron to the carbon rich organic constituents R and R' to form reactive radicals. These radicals may react with capping agents such as hydrogen (i.e., H$_2$) to form the carbon rich hydrocarbon molecules R—H and R'—H. The new molecules R—H and R'—H are shorter, and have lower specific gravity than the original molecule R—S—R' and are now suitable for dissolution into a hydrocarbon liquid, thus increasing the mass and volume of the resulting liquid phase. Solid phase comprises inorganic constituents including sodium sulfide and any coke which does not enter solution but also includes other inorganic constituents such as metals, alkali oxides and hydroxides, and nitrides. The solids can be separated from the liquid by one of many methods including centrifugation, filtration or gravimetric settling.

The reaction conditions for conversion of carbon-rich solids such as petroleum coke into fuel are within the same range for desulfurization of liquid hydrocarbon alone and are described above. For example, the radical capping agent may be hydrogen, methane or other agents as described above for desulfurization of liquid hydrocarbons. Likewise the conversion reaction is run at the same range of elevated pressures and temperatures as the desulfurization reaction described above.

Utilizing the present processes, a significant portion of the carbon-rich solids is converted into liquid fuel and particles comprising alkali metal sulfides. For example, the portion of petroleum coke converted to liquid fuel and particles comprising alkali metal sulfides may be at least 20 wt %. In some embodiments the portion converted is at least 20, 30, 40, or 50 wt % or a range between and including any two of the foregoing values, e.g., 20-50 wt %.

After the reaction with alkali metal and capping agent, the alkali-metal treated slurry may contain not only unreacted particles of the carbon-rich solids, but particles including alkali metal salts. These particles may be separated from the liquid hydrocarbon/fuel mixture using the same elemental sulfur process as herein described. In addition, any of the subsequent processes described herein for processing the sulfur-treated liquid hydrocarbon and separated solids may also be employed. Alternatively, to aid in separation of alkali metal sulfide-containing solids form the fuel slurry, water or hydrogen sulfide may be used in place of sulfur, while mixing at the same temperatures and pressures described herein. In favorable cases, the separation process of U.S. Pat. No. 9,688,920, (incorporated by reference herein) may be used.

The processes of the present technology may further include separating the particles comprising alkali metal sulfides and any remaining carbon-rich solids (e.g., petroleum coke) from the mixture of liquid hydrocarbon and liquid fuel. The same techniques described above for first mixture of liquid hydrocarbon and particles may also be used for this aspect as well.

Those skilled in the art will appreciate that additional heaters and coolers may be located between the various vessels and reactors to heat or cool the oil or slurry to appropriate process operating temperatures or to more easily recover heat generated in the process.

Figure 2:
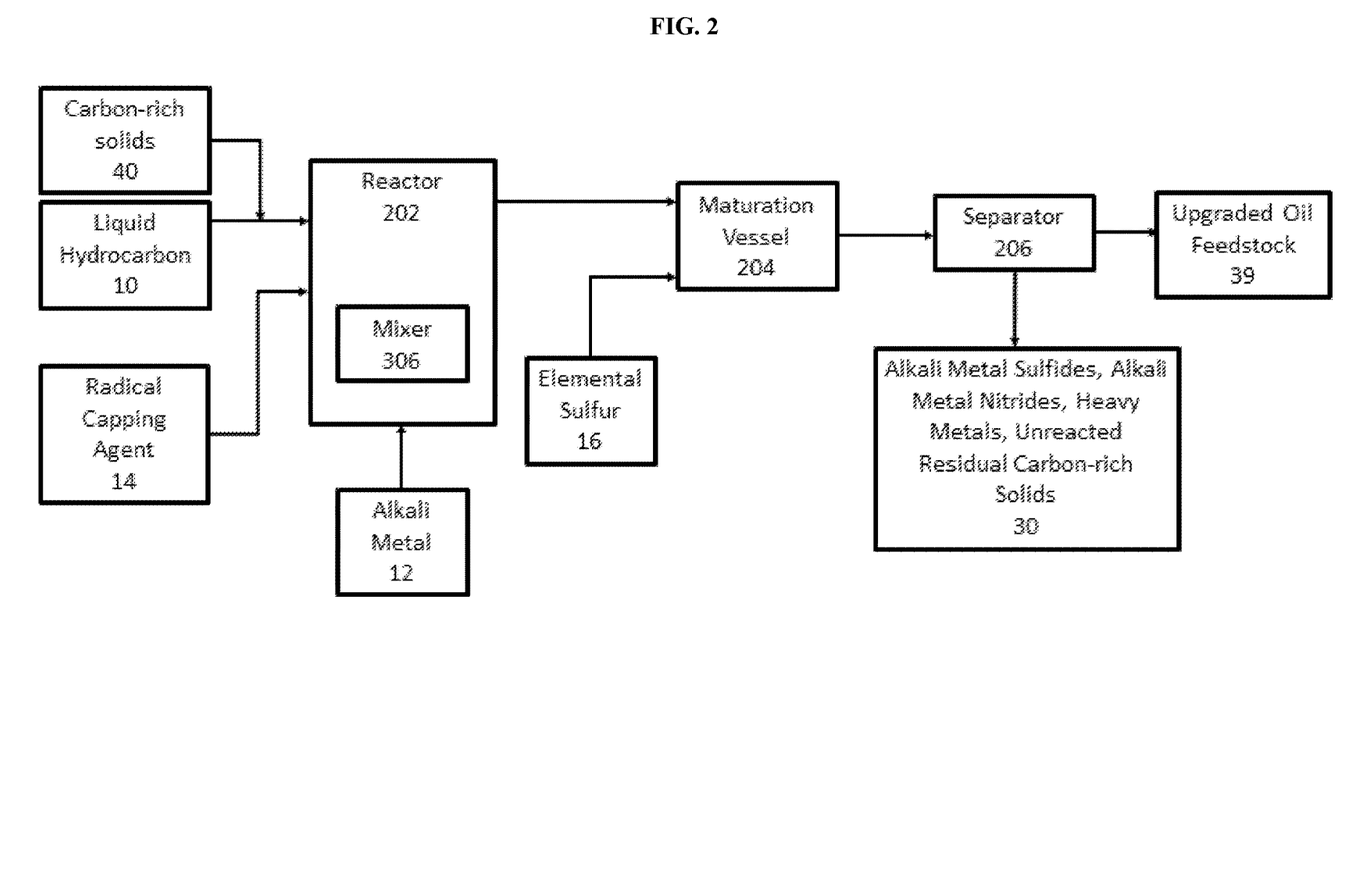
FIG. 2 shows a process flow diagram for an illustrative embodiment of the present technology for converting coke to a liquid fuel while simultaneously reducing or removing sulfur, metals and other heteroatoms.

FIG. 2 shows an illustrative embodiment of the present processes. Finely milled (e.g., majority of particles between 1 μm and 1 mm) petroleum coke 40 is added to a stream of liquid hydrocarbon, e.g., oil feedstock 10. The resulting slurry or suspension is fed to a reactor 202 where it is combined with an alkali metal 12 (e.g., metallic sodium) and a radical capping agent 14, such as hydrogen gas, methane and/or other hydrocarbons, hydrogen sulfide, or ammonia, (or mixtures of any two or more) at elevated temperature and pressure. Under the reaction conditions the alkali metal is in a molten state. The reactants are mixed in the reactor by mixer 306 for a period of time (e.g., 5-60 minutes) to allow the conversion of the coke into a liquid fuel to take place and heteroatoms (such as sulfur and nitrogen) and other heavy metals to be removed from the liquid hydrocarbon feedstock 10 and coke 40. The product, a mixture of desulfurized feedstock, liquid fuel and inorganic solids such as alkali metal sulfides, nitrides, heavy metals and unreacted coke are sent to the maturation vessel 204, where the mixture is treated with elemental sulfur 16 as described above for FIG. 1. The (optionally cooled) sulfur-treated mixture is fed to a solid/liquid separation apparatus 206, which typically includes a centrifuge but may also include a filter. The separated solids 30 exit the separation apparatus for further processing, and the upgraded oil feedstock 39 containing the liquid fuel produced from the petroleum coke may be further treated as described above for FIG. 1. The solids 30 may include, e.g., alkali metal sulfides, alkali metal nitrides, heavy metals, and unreacted residual coke. The solids 110 may also be further processed as described for FIG. 1 to regenerate the alkali metal.

EXAMPLES

Example 1—Desulfurization with Sodium Followed by Sulfur Treatment and Solids Separation A vacuum residuum oil feedstock was treated with sodium metal in a pilot plant using a continuous system essentially as shown in FIG. 1 under the following conditions to yield a mixture of treated oil and fine particles comprising sodium sulfide.
Oil Feed Rate: 66 kg/h
Sodium Feed Rate: 2.1 kg/h
Hydrogen Feed Rate: 250 g/h
Reaction Temperature: 352° C.
Reaction Pressure: 1425 psi Aliquots of the mixture of oil and fine particles were mixed with elemental sulfur under the following batch conditions (Table 1). The amount of sulfur remaining in the oil was measured.

TABLE 1

| Trial | Oil Added (g) | Sulfur Added (g) | Temperature (° C.) | Pressure (psi) | Hold Time (min) | Wt % Sulfur |
|---|---|---|---|---|---|---|
| 1A | 200.3 | 0.678 | 350 | 300-350 | 60 | 0.17 |
| 1B | 199.9 | 2.861 | 350 | 300-350 | 60 | 0.18 |
| 1C | 200 | 5.06 | 350 | 300-350 | 60 | 0.21 |
| 1D | 200.1 | 8.371 | 350 | 300-350 | 60 | 0.54 |

Example 2—Continuous Desulfurization with Sodium Followed by Continuous Sulfur Treatment and Solids Separation A vacuum residuum oil feedstock was treated with sodium metal in a pilot plant using a continuous system essentially as shown in FIG. 1 under the following four trial conditions to yield a mixture of treated oil and fine particles comprising sodium sulfide.

TABLE 2

| Trial | Oil feed rate (kg/h) | Sodium feed rate (g/min) | Hydrogen feed rate (g/h) | Reaction Temp. (deg C.) | Reaction P (psi) |
|---|---|---|---|---|---|
| 2A | 65.8 | 35 | 250 | 378 | 750 |
| 2B | 65.8 | 36 | 250 | 378 | 750 |
| 2C | 65.7 | 35 | 250 | 350 | 750 |
| 2D | 65.9 | 35 | 279 | 358 | 750 |

Trials 2A-2D provided four mixtures of sodium-reacted oil feedstock and particles containing sodium sulfide that were processed in a continuous fashion at a pilot plant using the present separation process in accordance with FIG. 1 and the conditions of Trials 3A to 3D shown below in Table 3. The amount of sulfur was measured in the desulfurized liquid hydrocarbons.

TABLE 3

| Conditions | Sulfur Feed Rate (g/min) | Temperature (° C.) | Pressure (psi) | Hold Time (min) | Wt % Sulfur |
|---|---|---|---|---|---|
| 3A | 12.2 | 343 | 280 | 70 | 0.37 |
| 3B | 35 | 350 | 300 | 70 | 0.4 |
| 3C | 45 | 346 | 300 | 70 | 0.45 |
| 3D | 10 | 350 | 300 | 70 | 0.48 |

Example 3—Removal of Residual Sodium from Desulfurized Liquid Hydrocarbons

After desulfurization and separation of solids in accordance with the procedure of Example 2, the desulfurized liquid hydrocarbons were treated with a mixture of acetic acid and sodium acetate in accordance with the process of FIG. 1 and under the conditions shown below in Table 4.

TABLE 4

| Trials* | Initial [Na] (ppm) | Acetic Acid/Na ratio | Temperature (° C.) | Time (min) | Final [Na] (ppm) |
|---|---|---|---|---|---|
| 4A (Batch) | 1500 | 1.0 | 350 | 30 | 72 |
| 4B | 530 | 2.3 | 323 | 55 | 82 |
| 4C | 530 | 6.4 | 313 | 5 | 72 |
| 4D | 530 | 6.4 | 245 | 5 | 64 |
| 4E | 530 | 6.4 | 267 | 55 | 11 |

*Continuous conditions except as indicated

Example 4—Desulfurization of Petroleum Coke

Ten grams of petroleum coke were mixed with 90 grams of a residual fuel oil, heated to 80° C., then centrifuged at the same temperature. The petroleum coke solid separated from the residual fuel oil. The petroleum coke and residual fuel had the compositions shown in Table 5 below.

TABLE 5

| Substance | C % | H % | N % | S % | V (ppm) | Ni (ppm) |
|---|---|---|---|---|---|---|
| Petroleum Coke | 82.05 | 3.56 | 1.84 | 5.97 | 502 | 176 |
| Residual Fuel Oil | 85.9 | 10.87 | 0.50 | 1.50 | 89 | 37 |

Example 5

A 5 weight % mixture of the petroleum coke with balance residual fuel oil from Example 4 was prepared. 700 grams was placed into a 1.8 L Parr reactor with a gas induction impellor and cooling loop. The reactor was purged with hydrogen. After purging, the sample was heated to operating temperature of 358° C. and pressure of 1514 psig. 22.71 grams molten sodium was pumped into the reactor using an electromagnetic pump. Hydrogen pressure was maintained by pumping hydrogen into the system while measuring the flow. At the end of the run the reactor contents were allowed to cool. Gases were slowly released. The flow rate of gases were measured using flow meters and analyzed using an Agilent Technologies Gas Chromatograph, Model 7890A. The reactor contents were centrifuged to separate the solids from the liquids and the solids were then rinsed with toluene to remove adhered liquids. The toluene rinse was evaporated using a rotary evaporator and the remaining liquid was added to the centrifuged liquid. The solids were rinsed again with pentane. The pentane rinse was evaporated off using a rotary evaporator and the remaining liquid was combined with the liquid from the centrifuge. The solids and liquids were characterized in the same manner as the original sample and a mass balance was calculated to determine the liquid yield. The final liquid had the composition shown in Table 6 below.

TABLE 6

| Substance | C % | H % | N % | S % | V (ppm) | Ni (ppm) |
|---|---|---|---|---|---|---|
| Feed Mixture | 85.71 | 10.50 | 0.57 | 1.72 | 109.5 | 44.1 |
| Liquid Product | 86.14 | 11.10 | 0.50 | 0.26 | 1.0 | 7.0 |

Hydrogen consumption was 14.7 standard liters. The liquid yield was 94.8 wt %. Sulfur was substantially removed as well as a small amount of nitrogen. Of the 35 grams of coke charged, bearing nearly 6% sulfur, approximately 11.3 grams went into the product liquid where the product was only 0.26% sulfur. Thus excluding the sulfur portion of the coke, there was 33 grams charged. Thus, approximately 34 wt % of the solid coke entered the liquid phase fuel product. The initial residual fuel had a specific gravity of 994 kg/m$^3$ while the desulfurized product with the coke additional was 980 kg/m$^3$. The portion of the materials considered residuum were as shown in Table 7.

TABLE 7

| Substance | Fraction boiling above 524 C. |
|---|---|
| Petroleum coke | 100% |
| Residual fuel | 63.1% |
| Treated mixture product | 53.8% |

Example 6

Example 5 was repeated except rather than 5 wt % petroleum coke, 10 weight % coke was prepared then operated in the same manner except only 21.07 grams sodium was added and the operating pressure was slightly lower at 1499 psig. The final liquid had the composition shown in Table 7.

TABLE 7

| Substance | C % | H % | N % | S % | V (ppm) | Ni (ppm) |
|---|---|---|---|---|---|---|
| Feed Mixture | 85.52 | 10.14 | 0.63 | 1.95 | 109.5 | 44.1 |
| Liquid Product | 87.06 | 10.92 | 0.52 | 0.17 | 2.3 | 5.4 |

Hydrogen consumption was 17.1 standard liters. The liquid yield was 85.45 wt %. Sulfur was substantially removed as well as a small amount of nitrogen. Of the 70 grams coke charged, bearing nearly 6% sulfur, approximately 19.4 grams went into the product liquid where the product was only 0.17% sulfur. Thus excluding the sulfur portion of the coke, there was 65.9 grams charged. Thus approximately 29% of the solid coke entered the liquid phase fuel product. The initial residual fuel had a specific gravity of 994 kg/m$^3$ while the desulfurized product with the coke additional was 984 kg/m$^3$.

Based on the specific gravity in the desulfurized product, the final fuel is still a residual fuel but now it meets the sulfur specification where there will be very large demand and will command a price similar to distillate while the starting materials, especially the coke would be priced substantially below the price of the product.

The solids can be treated and according to the procedures of Gordon et. al. in U.S. Pat. No. 8,088,270 to regenerate the sodium so it may be recycled to the process.

Of course, other hydrocarbon liquids capable of dissolving organic molecules rich in carbon could have been utilized rather than the one selected. For example, if the dissolving liquid already has a low sulfur content then less sodium could be added to the reaction and less hydrogen donation required. It may be noted than when 5% coke was added, 34% of the desulfurized coke entered the liquid phase while when 10% coke was added only 29% of the desulfurized coke entered the liquid phase. But if the coke has extremely low value and the product is priced similar to distillate, then accepting lower portions entering the liquid phase may still be desirable. Conversely, adding a lower relative amount of coke the portion entering the liquid phase is expected to be greater. Also, other liquids may be conducive to increasing the solubility of the treated coke. For example, asphaltenes are soluble in toluene. Adding particular hydrocarbons may be conducive to increasing the solubility of the molten sodium treated petroleum coke and are part of the scope of this invention.

EQUIVALENTS

While certain embodiments have been illustrated and described, a person with ordinary skill in the art, after reading the foregoing specification, can affect changes, substitutions of equivalents and other types of alterations to the processes of the present technology and products thereof as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, feedstocks, compositions, or conditions, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A process comprising:
   heating a first mixture of elemental sulfur and particles comprising an alkali metal sulfide in a liquid hydrocarbon to a temperature of at least 150° C., to provide a sulfur-treated mixture comprising agglomerated particles;
   separating the agglomerated particles from the sulfur-treated mixture to provide a desulfurized liquid hydrocarbon and separated solids.

2. The process of claim 1 wherein the alkali metal sulfide comprises sodium sulfide.

3. The process of claim 1 further comprising mixing the first mixture during heating.

4. The process of claim 1 wherein the first mixture is heated to a temperature of 150° C. to about 450° C.

5. The process of claim 1 wherein the process takes place at a pressure from about 15 psi to about 1500 psi.

6. The process of claim 1 wherein the first mixture is heated for a period of 15 minutes to about 2 hours.

7. The process of claim 1 further comprising forming the first mixture by combining elemental sulfur with the liquid hydrocarbon comprising particles.

8. The process of claim 1 wherein the first mixture further comprises alkali metal in its metallic state.

9. The process of claim 1 wherein the first mixture comprises 1-100 wt % alkali metal in its metallic state with respect to the weight of alkali metal in the alkali metal sulfide.

10. The process of claim 1 wherein the first mixture further comprises alkali metal oxides and/or metals other than alkali metals.

11. The process of claim 1 wherein the agglomerated particles comprise an alkali metal sulfide and/or alkali metal hydrosulfide.

12. The process of claim 1 wherein the agglomerated particles comprise sodium sulfide and/or sodium hydrosulfide.

13. The process of claim 1 wherein separating the agglomerated particles from the sulfur-treated mixture comprises filtering, settling, or centrifuging the sulfur-treated mixture.

14. The process of claim 1 wherein separating the agglomerated particles from the sulfur-treated mixture comprises centrifuging the sulfur-treated mixture at 15° C. to 150° C.

15. The process of claim 1 wherein the desulfurized liquid hydrocarbon contains not more than 0.5 wt % sulfur.

16. The process of claim 1, wherein the desulfurized liquid hydrocarbon comprises residual alkali metal.

17. The process of claim 16 wherein the residual alkali metal is present at 400 ppm to 2000 ppm.

18. The process of claim 16 further comprising adding a salt-forming substance to the desulfurized liquid hydrocarbon to form a second mixture, wherein the salt-forming substance converts the residual alkali metal to an alkali metal salt.

19. The process of claim 18 wherein the salt-forming substance is selected from the group consisting of elemental sulfur, hydrogen sulfide, formic acid, acetic acid, propanoic acid and water.

20. The process of claim 18 wherein an amount of salt-forming substance added is equal to about 1 to about 4 times the molar amount of residual alkali metal.

21. The process of claim 18 wherein the addition of salt-forming substance is carried out at a temperature of about 150° C. to about 450° C.

22. The process of claim 18 wherein the addition of salt-forming substance is carried out at a pressure of about 50 psi to about 2,500 psi.

23. The process of claim 18 further comprising separating the alkali metal salts from the second mixture to provide a desulfurized and demetallized liquid hydrocarbon.

24. The process of claim 23 wherein separating the alkali metal salts from the second mixture comprises filtering, settling, or centrifuging the second mixture to remove the alkali metal salts and provide the desulfurized and demetallized liquid hydrocarbon.

25. The process of claim 1 further comprising mixing the separated solids with an organic liquid and separating the separated solids from the organic liquid to provide washed solids.

26. The process of claim 25 wherein the organic liquid is selected from toluene, xylene, hexanes and diesel.

27. The process of claim 25 further comprising drying the washed solids.

28. The process of claim 1 further comprising contacting a liquid hydrocarbon comprising sulfur compounds with molten alkali metal in its metallic state and a capping agent to provide a mixture of the liquid hydrocarbon and particles comprising alkali metal sulfides.

29. The process of claim 28 wherein the alkali metal is sodium.

30. The process of claim 28 wherein the capping agent is hydrogen or a C1-C6 acyclic hydrocarbon, hydrogen sulfide, ammonia, or a mixture of any two or more thereof.

31. The process of claim 28 wherein the contacting takes place at a temperature of 250° C. to 400° C.

32. The process of claim 28 wherein the contacting takes place at a pressure of 400 to 1500 psi.

33. The process of claim 28 wherein the mixture of the liquid hydrocarbon and particles comprising alkali metal sulfides is produced in a reactor vessel and the first mixture and sulfur-treated mixture is produced in a separate vessel.

34. The process of claim 28 further comprising electrochemically producing the alkali metal in its metallic state.

\* \* \* \* \*